United States Patent
Nishida et al.

(10) Patent No.: US 12,164,305 B2
(45) Date of Patent: Dec. 10, 2024

(54) SELF-POSITION ESTIMATION METHOD

(71) Applicant: HONDA MOTOR CO., LTD., Tokyo (JP)

(72) Inventors: Takaaki Nishida, Saitama (JP); Yuji Hasegawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 443 days.

(21) Appl. No.: 17/459,171

(22) Filed: Aug. 27, 2021

(65) Prior Publication Data

US 2022/0066466 A1 Mar. 3, 2022

(30) Foreign Application Priority Data

Sep. 3, 2020 (JP) ................. 2020-148097

(51) Int. Cl.
*G05D 1/00* (2024.01)
*G06F 18/21* (2023.01)
*G06N 7/01* (2023.01)

(52) U.S. Cl.
CPC ......... *G05D 1/0272* (2013.01); *G05D 1/0221* (2013.01); *G06F 18/217* (2023.01); *G06N 7/01* (2023.01)

(58) Field of Classification Search
CPC .. G05D 1/0272; G05D 1/0221; G06F 18/217; G06F 18/251; G06N 7/01; G06N 3/044; G06N 3/08; G06V 10/803; G06V 10/44; G06V 10/757; G06T 2207/10021; G06T 2207/20081; G06T 2207/30252; G06T 7/579; G06T 7/593
See application file for complete search history.

(56) References Cited

U.S. PATENT DOCUMENTS

2012/0029698 A1 2/2012 Myeong et al.
2017/0276766 A1 9/2017 Aoyama
2020/0310435 A1* 10/2020 Hasegawa ............... G05D 1/027
(Continued)

FOREIGN PATENT DOCUMENTS

| CN | 111324116 B | * 9/2021 | ........... G05D 1/0221 |
| JP | 2007-149088 | 6/2007 | |
| JP | 2021163455 A | * 10/2021 | |

(Continued)

OTHER PUBLICATIONS

English Translation of WO-2019202806-A1 (Year: 2023).*
(Continued)

*Primary Examiner* — Rami Khatib
*Assistant Examiner* — Shahira Baajour
(74) *Attorney, Agent, or Firm* — Rankin, Hill & Clark LLP

(57) ABSTRACT

In a self-position estimation method, an actual self-position of a mobile object 1 is specified from self-positions each estimated by using a plurality of algorithms. The plurality of algorithms includes an MCL algorithm (11) and an algorithm (12) different from the MCL algorithm. In a case where reliability of an estimated value of the self-position obtained by using the MCL algorithm is low, the estimated value of the self-position obtained by using the MCL algorithm is corrected using an estimated value of the specified self-position or an estimated value of the self-position obtained by using the algorithm (12).

9 Claims, 6 Drawing Sheets

(56) References Cited

U.S. PATENT DOCUMENTS

2020/0349362 A1* 11/2020 Maloney .................. G01S 5/16

FOREIGN PATENT DOCUMENTS

| WO | 2018/109384 A1 | 6/2018 | | |
|----|----|----|----|----|
| WO | WO-2018179960 A1 * | 10/2018 | ............... | G05D 1/02 |
| WO | WO-2019202806 A1 * | 10/2019 | ........... | G01C 15/002 |

OTHER PUBLICATIONS

English Translation of JP-2021163455-A (Year: 2023).*
English Translation of CN-111324116-B (Year: 2023).*
English Translation of WO-2018179960-A1 (Year: 2024).*
German Search Report with English Translation dated Jan. 19, 2022, 11 pages.

* cited by examiner

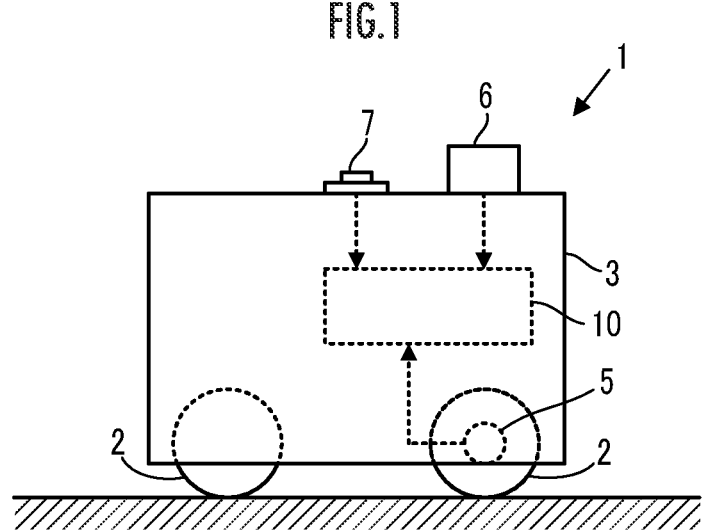

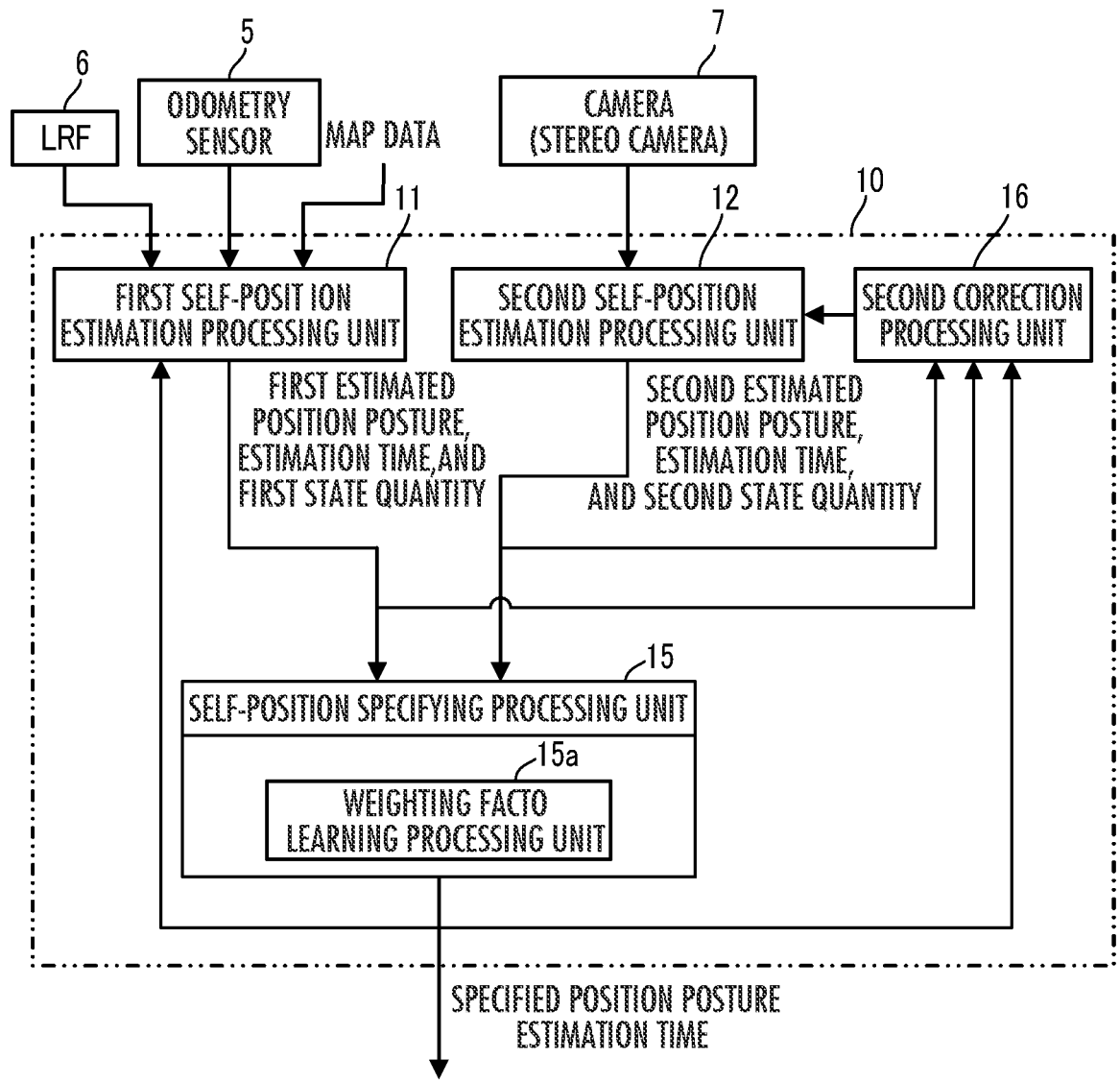

SELF-POSITION ESTIMATION METHOD

BACKGROUND

Technical Field

The present invention relates to a method for estimating a self-position of a mobile object.

Related Art

Various technologies of estimating a self-position of a mobile object, such as a mobile robot, by using detection information of a plurality of sensors according to the related arts have been proposed. For example, JP 2007-149088 A proposes a technology of estimating a self-position of a mobile object by using detection information of an internal sensor such as an encoder or a gyroscope and detection information of an external sensor such as a distance measurement sensor, an IR sensor, an ultrasonic sensor, or a camera.

In addition, various algorithms according to the related arts have been proposed as algorithms for estimating a self-position of a mobile object by using detection information of one or more sensors.

SUMMARY

Meanwhile, in a case where the self-position is estimated based on detection information of a plurality of sensors by using a plurality of algorithms, and the self-position of the mobile object is specified based on a plurality of estimated values of the self-position, a Monte Carlo localization (MCL) algorithm can be adopted as one of the plurality of algorithms.

However, in the MCL algorithm, in a case where a gap occurs between a map used in the processing (a map of a movement environment of the mobile object) and an actual movement environment of the mobile object due to a crowd, an environmental change, or the like, or in a case where an error of measurement data of a motion state (movement speed or the like) of the mobile object is increased, an error of the estimated self-position is often increased. As a result, in a case where the self-position of the mobile object is specified by reflecting the self-position of the mobile object obtained by using the MCL algorithm, the reliability of the specified self-position may be impaired.

The present invention has been made in view of such a background, and an object of the present invention is to provide a method for estimating a self-position of a mobile object by using a plurality of algorithms including the MCL algorithm, where the method enables the estimation (specification) of the self-position of the mobile object to be appropriately performed while appropriately correcting an estimated value of the self-position by using the MCL algorithm.

A self-position estimation method according to the present invention is a self-position estimation method by estimating, from detection information of a plurality of sensors, a self-position of a mobile object by using each of a plurality of algorithms each using detection information of one or more of the plurality of sensors, and by specifying the self-position of the mobile object based on an estimated value of the self-position obtained by using each of the plurality of algorithms, in which the plurality of algorithms includes an A-th algorithm which is a Monte Carlo localization (MCL) algorithm and a B-th algorithm different from the MCL algorithm, the self-position estimation method including:

a reliability determination step of determining a level of reliability of the A-th self-position estimated value which is an estimated value of the self-position obtained by using the A-th algorithm; and a correction step of performing, in a case where it is determined that the reliability of the A-th self-position estimated value is low, processing for correcting the A-th self-position estimated value by using any one of a self-position specified value which is the specified self-position, a B-th self-position estimated value which is an estimated value of the self-position obtained by using the B-th algorithm, and an estimated value of the self-position obtained by estimation using the MCL algorithm under an estimation processing condition different from that of the A-th algorithm (first aspect).

Note that, in the present invention, unless otherwise specified, the "self-position" of the mobile object means a self-position in a global coordinate system arbitrarily set in a movement environment of the mobile object. Further, the "self-position" is not limited to the position (coordinate position) of the mobile object in the normal sense, and can include the posture (orientation) of the mobile object.

According to the first aspect, in a case where it is determined that the reliability of the A-th self-position estimated value obtained by using the MCL algorithm (A-th algorithm) is low, the processing for correcting the A-th self-position estimated value by using any one of the self-position specified value, the B-th self-position estimated value, and the estimated value of the self-position obtained by estimation using the MCL algorithm under the estimation processing condition different from that of the A-th algorithm is performed.

With this configuration, it is possible to prevent the A-th self-position estimated value from diverging to the self-position that is deviated from the actual self-position of the mobile object. Eventually, it is possible to specify the self-position of the mobile object (obtain the self-position specified value) by using the A-th self-position estimated value having high reliability. Therefore, according to the first aspect, it is possible to appropriately estimate (specify) the self-position of the mobile object while appropriately correcting the estimated value of the self-position obtained by using the MCL algorithm.

According to the first aspect, in the reliability determination step, at least one of index values including a covariance generated in a process of estimating the self-position by using the A-th algorithm, a likelihood of a plurality of particles for a particle filter used in the A-th algorithm, and a deviation between the A-th self-position estimated value and the self-position specified value or between the A-th self-position estimated value and the B-th self-position estimated value may be used to determine the level of reliability of the A-th self-position estimated value (second aspect).

With this configuration, it is possible to appropriately determine the level of reliability of the A-th self-position estimated value.

According to the first or second aspect, in the correction step, the plurality of particles for the particle filter used in the MCL algorithm may partially or entirely be generated around the self-position specified value or the B-th self-position estimated value, and the A-th self-position estimated value may be obtained by using the MCL algorithm and using the generated particles (third aspect).

Alternatively, in the correction step, processing of estimating the self-position of the mobile object by setting the self-position specified value or the B-th self-position estimated value as an initial position of the mobile object and by using a second MCL algorithm different from a first MCL algorithm which is the MCL algorithm may be performed in parallel with processing of estimating the self-position continuously by using the first MCL algorithm, as well as processing of comparing a level of reliability of an A1-th self-position estimated value which is an estimated value of the self-position obtained by using the first MCL algorithm with a level of reliability of an A2-th self-position estimated value which is an estimated value of the self-position obtained by using the second MCL algorithm, and, following confirmation of a result of the comparison, estimating the self-position by using one of the first MCL algorithm and the second MCL algorithm that corresponds to one of the A1-th self-position estimated value and the A2-th self-position estimated value, whichever has higher reliability than the other, may be performed (fourth aspect).

Alternatively, in a case where the reliability determination step includes a step of determining, as the level of reliability of the A-th self-position estimated value, a level of reliability of detection information of an odometry sensor included in the plurality of sensors as a sensor used in the MCL algorithm, in the correction step in a case where it is determined that the reliability of the detection information of the odometry sensor is low, processing of estimating the self-position of the mobile object by setting, as an initial position of the mobile object, the A-th self-position estimated value obtained by using a first MCL algorithm which is the MCL algorithm and by using a third MCL algorithm whose estimation processing condition is different from that of the first MCL algorithm may be performed in parallel with processing of estimating the self-position continuously by using the first MCL algorithm, and processing of comparing a level of reliability of an A1-th self-position estimated value which is an estimated value of the self-position obtained by using the first MCL algorithm with a level of reliability of an A3-th self-position estimated value which is an estimated value of the self-position obtained by using the third MCL algorithm, and, following confirmation of a result of the comparison, estimating the self-position by using one of the first MCL algorithm and the third MCL algorithm that corresponds to one of the A1-th self-position estimated value and the A3-th self-position estimated value, whichever has higher reliability than the other, may be performed (fifth aspect).

According to the third to fifth aspects, it is possible to effectively prevent the A-th self-position estimated value from diverging to the self-position that is deviated from the actual self-position.

BRIEF DESCRIPTION OF DRAWINGS

FIG. 1 is a diagram illustrating a mobile object in embodiments (a first embodiment and a second embodiment) of the present invention;

FIG. 2 is a block diagram illustrating a functional configuration of a self-position estimation processing device according to the first embodiment;

DETAILED DESCRIPTION

First Embodiment

Figure 3A:
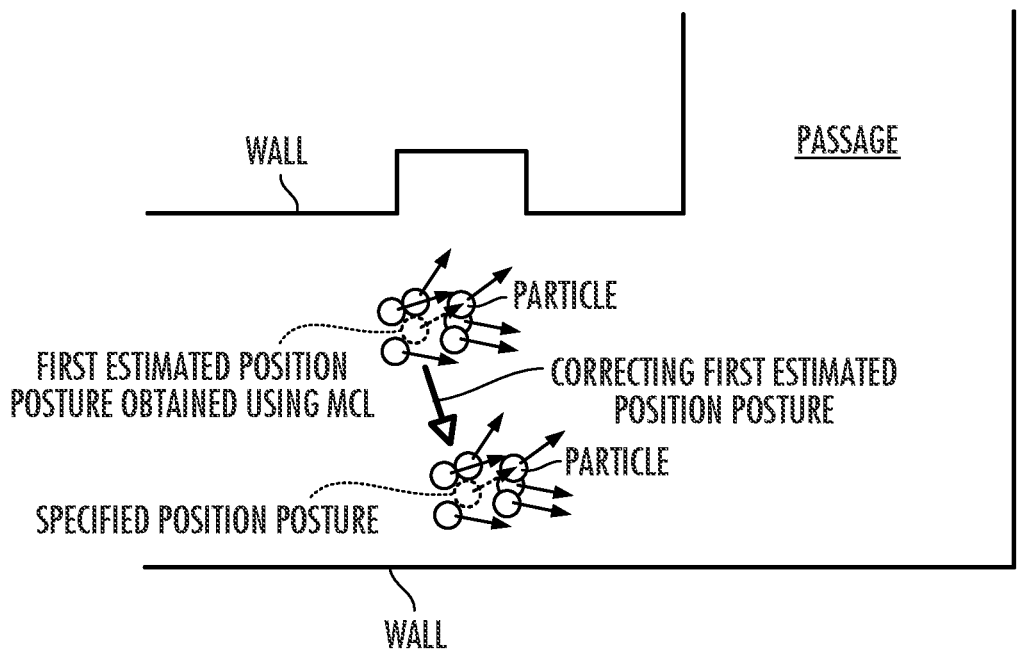
FIG. 3A is an explanatory diagram related to a first example of correction processing performed by a first self-position estimation processing unit illustrated in FIG. 2.

A first embodiment of the present invention will be described below with reference to FIGS. 1 to 4C. Referring to FIG. 1, a mobile object 1 in the present embodiment is, for example, a wheel-type mobile object, and includes a machine body 3 supported via a plurality of wheels 2 on a floor surface of a movement environment thereof. Then, the mobile object 1 moves on the floor surface in a manner in which one or more wheels 2 are rotated or are rotated and steered (turned) by an actuator such as an electric motor (not illustrated).

A plurality of sensors used to estimate a self-position is mounted on the mobile object 1. For example, an odometry sensor 5 such as an angle sensor that detects a rotation angle of one or more wheels 2, a laser range finder 6 (hereinafter, referred to as the LRF 6) as a distance measurement sensor that measures a distance to an external object present around the mobile object 1, and a camera 7 that captures an image of a ceiling present above the mobile object 1 are mounted on the mobile object 1. Note that the odometry sensor 5 can include a sensor that detects a steering angle of a steerable wheel among the wheels 2 in addition to the angle sensor that detects the rotation angle of the wheels 2. Further, in the present embodiment, the camera 7 is a stereo camera.

A self-position estimation processing device 10 that performs self-position estimation by using detection information of these sensors is mounted on the mobile object 1. The self-position estimation processing device 10 includes, for example, one or more electronic circuit units including a processor such as a microcomputer, a memory, an interface circuit, and the like.

As illustrated in a block diagram of FIG. 2, the self-position estimation processing device 10 includes a first self-position estimation processing unit 11, a second self-position estimation processing unit 12, a self-position specifying processing unit 15, and a second correction processing unit 16 as functions implemented by both or one of an implemented hardware configuration and a program (software configuration). Note that the self-position estimation processing device 10 is not limited to the above-described functions, and can include, for example, a function of performing a movement control for the mobile object 1 or the like.

The first self-position estimation processing unit 11 is a functional unit that performs processing of estimating the self-position of the mobile object 1 by using detection information of the LRF 6 and detection information of the odometry sensor 5, and the second self-position estimation processing unit 12 is a functional unit that performs processing of estimating the self-position of the mobile object 1 by using detection information of the camera 7.

Note that, in the present embodiment, the self-position of the mobile object 1 estimated by each of the first and second self-position estimation processing units 11 and 12 is more specifically a set of the position and the posture (orientation) of the mobile object 1 in a global coordinate system arbitrarily set in the movement environment of the mobile object 1. In the present embodiment, the self-position of the mobile object 1 estimated by the first self-position estimation processing unit 11 corresponds to an A-th self-position estimated value in the present invention, and the self-position of the mobile object 1 estimated by the second self-position estimation processing unit 12 corresponds to a B-th self-position estimated value in the present invention.

In the following description, the self-position estimated by each of the first and second self-position estimation processing units 11 and 12 may be referred to as an estimated position posture. Furthermore, the estimated position posture obtained by the first self-position estimation processing unit 11 may be referred to as a first estimated position posture, and the estimated position posture obtained by the second self-position estimation processing unit 12 may be referred to as a second estimated position posture.

The self-position specifying processing unit 15 is a functional unit that specifies (confirms) the self-position of the mobile object 1 based on the first estimated position posture and the second estimated position posture of the mobile object 1 output from the first and second self-position estimation processing units 11 and 12, respectively.

The self-position specifying processing unit 15 includes a weighting factor learning processing unit 15a subjected to learning for setting a weighting factor for each of the first estimated position posture and the second estimated position posture of the mobile object 1 input from the first and second self-position estimation processing units 11 and 12 in advance.

Then, the self-position specifying processing unit 15 specifies the self-position of the mobile object 1 by combining the input first estimated position posture and the input second estimated position posture by using the weighting factor set by the weighting factor learning processing unit 15a. Hereinafter, the self-position of the mobile object 1 specified by the self-position specifying processing unit 15 may be referred to as a specified position posture. The specified position posture corresponds to a self-position specified value in the present invention.

Furthermore, the second correction processing unit 16 is a functional unit that appropriately generates a correction parameter for correcting the self-position (second estimated position posture) estimated by the second self-position estimation processing unit 12 and inputs the correction parameter to the second self-position estimation processing unit 12.

Hereinafter, the entire processing of the self-position estimation processing device 10 will be described together with the details of each functional unit described above. The processing performed by the first and second self-position estimation processing units 11 and 12 are performed as described below. The detection information of each of the LRF 6 and the odometry sensor 5 is input to the first self-position estimation processing unit 11, together with map data (for example, a two-dimensional occupancy grid map) of the movement environment of the mobile object 1. In this case, the map data is stored and held in advance in the memory of the self-position estimation processing device 10. Alternatively, the map data is downloaded from an external server or the like as needed.

Then, the first self-position estimation processing unit 11 sequentially estimates the self-position of the mobile object 1 (sequentially determines the first estimated position posture) by using a predetermined self-position estimation algorithm based on the detection information of the LRF 6 (distance measurement data of an external object around the mobile object 1), the detection information of the odometry sensor 5, and the map data.

In the present embodiment, the first self-position estimation processing unit 11 uses, as the self-position estimation algorithm, a Monte Carlo localization (MCL) algorithm (more specifically, for example, an adaptive Monte Carlo localization (AMCL) algorithm) which is a known algorithm for performing self-position estimation using a particle filter. The algorithm corresponds to an A-th algorithm in the present invention.

In the MCL algorithm, the self-position (self-position in the global coordinate system) of the mobile object 1 is sequentially estimated by the following processing. That is, first, a plurality of particles in the particle filter are generated around the mobile object 1 according to an initial position and an initial posture (orientation) of the mobile object 1. Note that the initial position and the initial posture of the mobile object 1 are specified, for example, at the start of movement of the mobile object 1 or immediately before the movement, by using the detection data of the LRF 6 (distance measurement data of an external object around the mobile object 1) and the map data.

Then, a new movement position posture (position and posture) of each particle is estimated according to the motion state (translational velocity, angular velocity, and the like) of the mobile object 1 estimated based on the detection information of the odometry sensor 5. In this case, the new movement position posture of each particle is estimated by stochastically reflecting an error of the detection information of the odometry sensor 5 (an error of normal distribution or the like).

Next, distance measurement data of an external object around the mobile object 1 is acquired by using the LRF 6. The likelihood of the new movement position posture of each particle is calculated based on the distance measurement data and the map data. Then, resampling processing is performed, and as a result, particles having a low likelihood are eliminated. Furthermore, new particles (for example, copies of particles having a high likelihood) are generated around particles having a high likelihood.

In the MCL algorithm, the self-position of the mobile object 1 is sequentially estimated (the first estimated position posture of the mobile object 1 is sequentially determined) based on the position postures of the particles having a high likelihood obtained by sequentially performing the processing as described above. For example, a position posture obtained by combining the position postures of the respective particles having a high likelihood using a weighting factor set according to each likelihood is obtained as an estimated value (first estimated position posture) of the self-position of the mobile object 1. Note that, in the present embodiment, the posture in the self-position (first estimated position posture) of the mobile object 1 estimated by using the MCL algorithm is the posture (orientation) of the mobile object 1 in a yaw direction (a rotation direction around an axis in a vertical direction).

In addition, in the MCL algorithm, a covariance (specifically, a variance-covariance) as a state quantity related to the certainty of the first estimated position posture is generated in a process of performing the processing of estimating the self-position of the mobile object 1. Then, the first self-position estimation processing unit 11 sequentially outputs the self-position (first estimated position posture) of the mobile object 1 estimated by using the MCL algorithm as described above and an estimation time which is a time at which the estimation is performed. In addition, the first self-position estimation processing unit 11 outputs the covariance (variance-covariance) as the state quantity (hereinafter, referred to as a state quantity 1) related to the certainty of the first estimated position posture.

Note that, in the present embodiment, the first self-position estimation processing unit 11 performs processing of correcting the output first estimated position posture in a situation where it is determined that the reliability of the first estimated position posture obtained by using the MCL algorithm is low. This correction processing will be described later in detail.

A captured image (in the present embodiment, a captured image of the ceiling above the mobile object 1) as the detection information of the camera 7 is input to the second self-position estimation processing unit 12. Note that, in the present embodiment, since the camera 7 is a stereo camera, the detection information (captured image) of the camera 7 input to the second self-position estimation processing unit 12 is a stereo image (a pair of captured images). However, the camera 7 is not limited to a stereo camera, and may be a monocular camera.

Then, the second self-position estimation processing unit 12 sequentially estimates the self-position of the mobile object 1 (sequentially determines the second estimated position posture) by using a predetermined self-position estimation algorithm based on the input captured image.

In the present embodiment, the second self-position estimation processing unit 12 uses, as the self-position estimation algorithm, an algorithm for detecting a feature point from the input captured image and matching the feature point with a feature point detected from the input captured image in the past. More specifically, the second self-position estimation processing unit 12 uses, as the algorithm, for example, an algorithm of a known method called ORB_SLAM as one method of Visual_SLAM. The algorithm corresponds to a B-th algorithm in the present invention.

In the ORB_SLAM algorithm, the self-position of the mobile object 1 is sequentially estimated by the following processing. That is, after setting the initial position posture of the mobile object 1 (a set of the initial position and the initial posture of the mobile object 1 in the global coordinate system), the captured image obtained by the camera 7 is sequentially input to the second self-position estimation processing unit 12. Then, for each input captured image, processing of detecting an ORB feature point from the captured image is sequentially performed. Note that, as the initial position posture of the mobile object 1 in the processing performed by the second self-position estimation processing unit 12, for example, at the start of movement of the mobile object 1, the first estimated position posture of the mobile object 1 obtained by the first self-position estimation processing unit 11 at the start of movement or immediately before the movement is set. However, the initial position posture is appropriately reset by processing performed by the second correction processing unit 16 as described later.

Then, an ORB feature point detected from a newly input captured image (captured image at a time t) is compared with an ORB feature point detected from the past captured image that is immediately previously input (captured image at a time t−Δt), and matching between the ORB feature points is performed. In this matching, the ORB feature points whose difference (absolute value) in feature amount is equal to or less than a predetermined threshold are determined to be the same ORB feature points (ORB feature points corresponding to each other). Note that Δt is a sampling period of the captured image.

Then, a movement amount and a movement direction of the mobile object 1 in a period between the two points of time, t and t−Δt, are estimated based on the matching, and the second estimated position posture of the mobile object 1 at the time t is determined based on the estimated values of the movement amount and the movement direction and the second estimated position posture of the mobile object 1 at the time t−Δt.

More specifically, the movement amount and the movement direction of the mobile object 1 in the period between the two points of time, t and t−Δt, are estimated as the movement amount and the movement direction in a local coordinate system (a local coordinate system with the initial position as the origin) for the self-position estimation processing using the ORB_SLAM algorithm. Then, the estimated values of the movement amount and the movement direction of the mobile object 1 in the period between the time t and the time t−Δt are coordinate-transformed into the movement amount and the movement direction in the global coordinate system. The movement amount and the movement direction after the coordinate transformation are added to the second estimated position posture of the mobile object 1 (the second estimated position posture in the global coordinate system) at the time t−Δt. As a result, the second estimated position posture (the second estimated position posture in the global coordinate system) of the mobile object 1 at the time t is obtained. In this case, the coordinate transformation is determined according to a relative position/posture relationship between the local coordinate system and the global coordinate system defined by the initial position posture of the mobile object 1 in the global coordinate system.

In the ORB_SLAM algorithm, basically, the self-position of the mobile object 1 is sequentially estimated (the second estimated position posture of the mobile object 1 is sequentially determined) by sequentially performing the processing as described above. In this case, the posture in the second estimated position posture obtained by using the ORB_SLAM algorithm includes not only the posture in the yaw direction but also the posture in a roll direction and a pitch direction.

Note that, in the present embodiment, in a case where the correction parameter determined by the second correction processing unit 16 as described later is given from the second correction processing unit 16, the second self-position estimation processing unit 12 corrects the self-position (second estimated position posture) estimated as described above according to the correction parameter. Details of this correction processing will be described later.

Furthermore, in the ORB_SLAM algorithm, in the process of performing the processing of estimating the self-position of the mobile object 1, the estimated velocity/angular velocity of the mobile object 1 (the estimated values of the translational velocity and the angular velocity), the number (the total number) of detected ORB feature points, the number of matched ORB feature points (the number of ORB feature points determined to be the same as each other by the matching), an error value of an error function (a difference between the feature amounts in the matching), and an estimated state (the degree of accuracy of estimation of the estimated velocity/angular velocity of the mobile object 1) are generated as state quantities related to the certainty of the estimated position posture.

Then, the second self-position estimation processing unit 12 sequentially outputs the estimated self-position (second estimated position posture) of the mobile object 1 and an estimation time which is a time at which the estimation is performed. In addition, the second self-position estimation processing unit 12 outputs the estimated velocity/angular velocity of the mobile object 1 (the estimated values of the translational velocity and the angular velocity), the number of detected ORB feature points, the number of matched ORB feature points, the error value of the error function (the difference between the feature amounts in the matching), and the estimated state (the degree of accuracy of estimation of the estimated velocity/angular velocity of the mobile object 1) as state quantities (hereinafter, referred to as state quantities 2) related to the certainty of the second estimated position posture. Note that, instead of the number of ORB feature points and the number of matched ORB feature points, a ratio of the number of matched ORB feature points to the number (the total number) of ORB feature points may be output as an element of the state quantity 2.

The self-position specifying processing unit 15 receives the first estimated position posture, the estimation time, and the state quantity 1 from the first self-position estimation processing unit 11. In addition, the second estimated position posture, the estimation time, and the state quantity 2 are input from the second self-position estimation processing unit 12. Then, in the self-position specifying processing unit 15, processing of determining a weighting factor for each of the first estimated position posture and the second estimated position posture based on the input state quantities 1 and 2 is performed by the weighting factor learning processing unit 15a.

In the present embodiment, the weighting factor learning processing unit 15a includes a neural network. Then, for this neural network, multimodal learning using a feature vector including the state quantities 1 and 2 as multimodal information is performed in advance.

More specifically, the multimodal learning is learning that generates a weighting factor (a weighting factor corresponding to each of the first estimated position posture and the second estimated position posture) corresponding to a degree to which the self-position estimation processing for the mobile object 1 performed by using the algorithm of each of the first and second self-position estimation processing units 11 and 12 is appropriately performed as compared with a case of using other algorithms, based on the feature vector including various state quantities 1 and 2.

For the neural network of the weighting factor learning processing unit 15a, such multimodal learning is performed in advance. Therefore, in the weighting factor learning processing unit 15a, the neural network generates the weighting factor corresponding to each of the first estimated position posture and the second estimated position posture based on the feature vector including the input state quantities 1 and 2 and outputs the weighting factor.

In this case, basically, the neural network generates the weighting factor corresponding to each of the first estimated position posture and the second estimated position posture so that the higher the certainty of each of the first estimated position posture and the second estimated position posture of the mobile object 1 output from the first and second self-position estimation processing units 11 and 12, the larger the weighting factor, and outputs the weighting factor.

Then, the self-position specifying processing unit 15 specifies, as the specified position posture of the mobile object 1, a position posture obtained by combining the first estimated position posture and the second estimated position posture whose estimation time are the same as each other according to the weighting factor generated by the weighting factor learning processing unit 15a. That is, a position posture corresponding to the sum of a position posture obtained by multiplying the first estimated position posture by a corresponding weighting factor and a position posture obtained by multiplying the second estimated position posture by a corresponding weighting factor is specified as the specified position posture of the mobile object 1. At this time, the sum of the weighting factors is 1. Furthermore, in the present embodiment, the posture in the self-position (specified position posture) of the mobile object 1 specified by the self-position specifying processing unit 15 is the posture of the mobile object 1 in the yaw direction.

In the present embodiment, the self-position specifying processing unit 15 sequentially specifies the self-position (specified position posture) of the mobile object 1 as described above. Then, the self-position specifying processing unit 15 outputs a set of the specified position posture and an estimation time corresponding thereto.

Next, correction processing for the first estimated position posture performed by the first self-position estimation processing unit 11 will be described. In the present embodiment, the specified position posture output from the self-position specifying processing unit 15 is sequentially input to the first self-position estimation processing unit 11 as data that can be regarded as having relatively high reliability as an estimated value of the actual position posture of the mobile object 1. Then, the first self-position estimation processing unit 11 sequentially determines the level of reliability of the first estimated position posture obtained by using the algorithm while sequentially performing the MCL algorithm.

In this case, for example, in a case where one or more predetermined conditions determined in advance among a condition 1 that a variance of the positions and the postures of the plurality of particles obtained by resampling according to the likelihood of each of the plurality of particles is large (more specifically, a condition 1 that a value (absolute value) of a determinant of a covariance matrix representing the variance is larger than a predetermined threshold), a condition 2 that the sum or the maximum value of the likelihoods calculated for the plurality of particles before resampling (the plurality of particles moved according to the motion state of the mobile object 1) is smaller than a predetermined threshold, and a condition 3 that a deviation (absolute value) in position or posture between the first estimated position posture (latest value) obtained by using the MCL algorithm and the specified position posture (latest value) obtained by the self-position specifying processing unit 15 is larger than a predetermined threshold are satisfied, or in a case where the predetermined condition is continuously satisfied a predetermined number of times or more, the first self-position estimation processing unit 11 determines that the reliability of the first estimated position posture obtained by using the MCL algorithm is low. In other cases, the first self-position estimation processing unit 11 determines that the reliability of the first estimated position posture is high.

Note that, in a case where the predetermined conditions include two or more conditions among the conditions 1 to 3, a case where the predetermined condition is satisfied may be either a case where any one condition included in the predetermined conditions is satisfied or a case where two or more conditions included in the predetermined conditions are simultaneously satisfied.

As for the condition 3, in a situation where the reliability of the second estimated position posture obtained by the second self-position estimation processing unit 12 can be regarded as being relatively high, a condition 3' that a deviation in position or posture between the first estimated position posture (latest value) obtained by using the MCL algorithm and the second estimated position posture (latest value) obtained by the second self-position estimation processing unit 12 is larger than a predetermined threshold may be used instead of the condition 3.

Then, in a situation where it is determined that the reliability of the first estimated position posture is high, the first self-position estimation processing unit 11 outputs the self-position of the mobile object 1 estimated by using the MCL algorithm as it is as the first estimated position posture. On the other hand, in a situation where it is determined that the reliability of the first estimated position posture is low, the first self-position estimation processing unit 11 corrects the first estimated position posture to the specified position posture (latest value) obtained by the self-position specifying processing unit 15 as illustrated in FIG. 3A. Furthermore, the first self-position estimation processing unit 11 resamples a plurality of particles around the specified position posture, and then performing processing of sequentially estimating the self-position of the mobile object 1 using the MCL algorithm again.

That is, the first self-position estimation processing unit 11 initializes the self-position of the mobile object 1 to the specified position posture (latest value), and then performs processing of sequentially estimating the self-position of the mobile object 1 using the MCL algorithm again. Then, the first self-position estimation processing unit 11 outputs the estimated value of the self-position of the mobile object 1 obtained by performing the MCL algorithm again as the first estimated position posture.

Note that, in FIG. 3A, the position and the posture of each of the first estimated position posture and the specified position posture are indicated by a broken line circle and a broken line arrow, respectively, and the position and the posture of each particle are indicated by a solid line circle and a solid line arrow, respectively. The same applies to FIG. 3B and the like described later. In addition, in FIG. 3A, a plurality of particles around the first estimated position posture are illustrated as particles generated by the resampling processing in a case where the reliability of the first estimated position posture is high. A plurality of particles around the specified position posture are illustrated as particles generated by the resampling processing in a case where the reliability of the first estimated position posture is low.

Figure 3B:
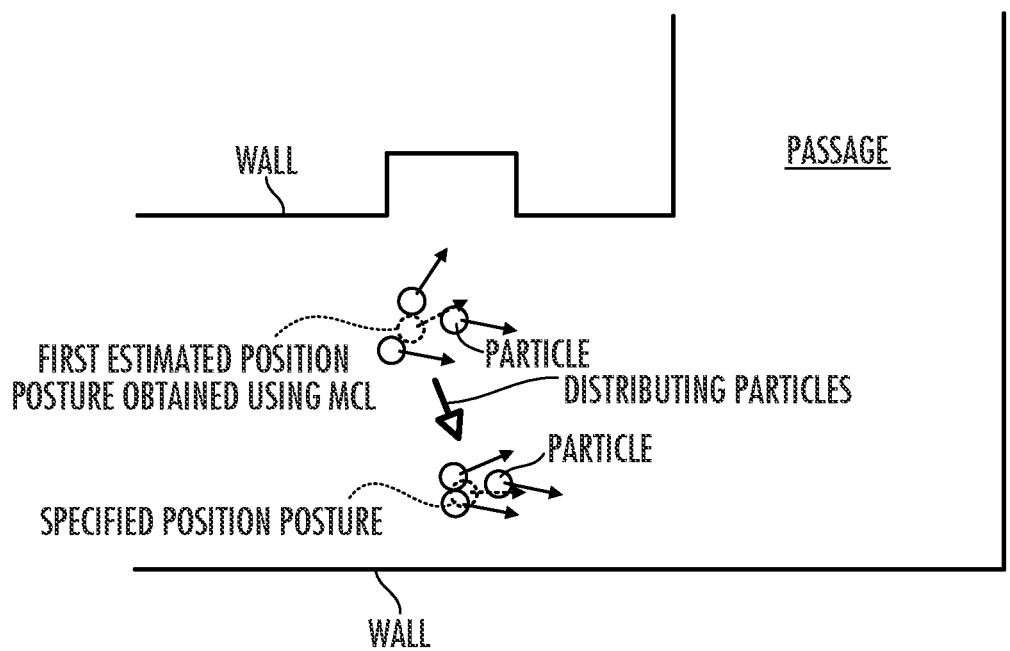
FIG. 3B is an explanatory diagram related to a second example of the correction processing performed by the first self-position estimation processing unit illustrated in FIG. 2.

Alternatively, in a situation where it is determined that the reliability of the first estimated position posture is low, when resampling the plurality of particles, the first self-position estimation processing unit 11 resamples some of the plurality of particles around the first estimated position posture obtained from the position postures of the particles having a high likelihood as illustrated in FIG. 3B. In addition, the first self-position estimation processing unit 11 resamples the remaining particles around the specified position posture (latest value) obtained by the self-position specifying processing unit 15. Then, after the resampling, the first self-position estimation processing unit 11 continues the processing of sequentially estimating the self-position of the mobile object 1 using the MCL algorithm (processing of sequentially obtaining the first estimated position posture). Then, the first self-position estimation processing unit 11 outputs the estimated value of the self-position of the mobile object 1 obtained by performing the MCL algorithm after the resampling as the first estimated position posture.

As described above, the first estimated position posture obtained by the first self-position estimation processing unit 11 using the MCL algorithm is corrected using the specified position posture output from the self-position specifying processing unit 15 in a situation where it is determined that the reliability is low. That is, in a situation where it is determined that the reliability of the first estimated position posture is low, as illustrated in FIG. 3A or 3B, resampling of the plurality of particles is performed so that the position postures of all or some of the plurality of particles to be resampled become position postures around the specified position posture that can be regarded as having relatively high reliability. After the resampling, the first estimated position posture is sequentially obtained by using the MCL algorithm.

In this case, the resampling of the plurality of particles is performed so that the position postures of all or some of the plurality of particles to be resampled become position postures around the specified position posture. Therefore, the first estimated position posture is generated by using the MCL algorithm so as to become closer to the specified position posture that can be regarded as having relatively high reliability. As a result, it is possible to prevent the first estimated position posture of the mobile object 1 obtained by the first self-position estimation processing unit 11 using the MCL algorithm from being diverging to the position posture that is deviated from the actual position posture of the mobile object 1.

In particular, in the processing described with reference to FIG. 3B, the plurality of resampled particles are arranged around both of the original first estimated position posture and the specified position posture. Therefore, even in a case where the accuracy of the specified position posture is decreased, it is possible to prevent the first estimated position posture from being deviated from the actual position posture due to the specified position posture having low accuracy.

Next, processing performed by the second correction processing unit 16 and processing performed by the second self-position estimation processing unit 12 corresponding thereto will be described. The second correction processing unit 16 receives a set of the first estimated position posture and the estimation time output from the first self-position estimation processing unit 11, a set of the second estimated position posture and the estimation time output from the second self-position estimation processing unit 12, and a set of the specified position posture and the estimation time output from the self-position specifying processing unit 15. Then, the second correction processing unit 16 stores and holds the input data of the first estimated position posture, the second estimated position posture, and the specified position posture in a memory (not illustrated) in time series together with the corresponding estimation times. In this case, the data stored and held in the memory are data input to the second correction processing unit 16, the data including the latest data to data obtained a predetermined time ago.

Then, the second correction processing unit 16 first determines whether or not the estimation processing (generation processing for the second estimated position posture) performed by the second self-position estimation processing unit 12 is normally performed every time the second estimated position posture is input. Here, in the present embodiment, the mobile object 1 moves on a floor surface in a building having a ceiling. Therefore, the posture of the mobile object 1 is not changed much in the roll direction (a direction around the axis of the mobile object 1 in a front-rear direction) or the pitch direction (a direction around the axis of the mobile object 1 in a left-right direction).

Therefore, for example, in a case where the posture in the second estimated position posture newly determined by the second self-position estimation processing unit 12 at the latest processing timing is changed from the posture in the second estimated position posture determined at an immediately previous processing timing by more than a predetermined amount in the roll direction or the pitch direction, the second correction processing unit 16 determines that the processing of estimating the self-position of the mobile object 1 performed by the second self-position estimation processing unit 12 is not normally performed.

Then, in this case, the second correction processing unit 16 instructs the second self-position estimation processing unit 12 to reset the first estimated position posture output from the first self-position estimation processing unit 11 at the estimation time corresponding to the latest second estimated position posture or a time substantially coincident therewith as a new initial position posture of the mobile object 1 in the processing performed by the second self-position estimation processing unit 12. Then, the second correction processing unit 16 inputs the first estimated position posture to the second self-position estimation processing unit 12.

At this time, the second self-position estimation processing unit 12 resets the input first estimated position posture as a new initial position posture of the mobile object 1, and eventually resets the local coordinate system in the estimation processing performed by the second self-position estimation processing unit 12. Then, the second self-position estimation processing unit 12 performs the processing of estimating the self-position of the mobile object 1 by using the reset local coordinate system from then on.

In addition, in a case where the change of the posture in the second estimated position posture in the roll direction and the pitch direction remains equal to or less than the predetermined amount, the second correction processing unit 16 determines that the processing of estimating the self-position of the mobile object 1 performed by the second self-position estimation processing unit 12 is normally performed.

In this case, for example, the second correction processing unit 16 performs correction parameter determination processing described below every time a predetermined period elapses (moreover, intermittently). Note that the predetermined period is, for example, a period from when the period starts to when the number of samples (the number of frames) of the captured image of the camera 7 acquired by the second self-position estimation processing unit 12 reaches a predetermined number.

In the correction parameter determination processing, when the predetermined period has elapsed for the first time after the start of the movement of the mobile object 1, the second correction processing unit 16 extracts time-series data of the second estimated position posture output from the second self-position estimation processing unit 12 and time-series data of the first estimated position posture output from the first self-position estimation processing unit 11 from a memory (not illustrated) within the first predetermined period. Further, when the predetermined period has elapsed for the second and subsequent times, the second correction processing unit 16 extracts time-series data of the first estimated position posture output from the first self-position estimation processing unit 11 and time-series data of the specified position posture output from the self-position specifying processing unit 15 from the memory (not illustrated) within each predetermined period. Note that, in a case of timings corresponding to the start points of the second and subsequent predetermined periods, when the initial position posture of the mobile object 1 is reset in the second self-position estimation processing unit 12 as described above, a timing at which the resetting is performed is a timing corresponding to the start point of a new predetermined period.

Here, the estimation processing performed by the second self-position estimation processing unit 12 is processing of integrating the sequentially obtained movement amount and movement direction of the mobile object 1 based on the initial position posture of the mobile object 1. For this reason, an error of the second estimated position posture of the mobile object 1 sequentially obtained by the second self-position estimation processing unit 12 may be accumulatively increased due to an error of the initial position posture (the initial position posture in the global coordinate system) of the mobile object 1, an estimation error of the movement amount and the movement direction of the mobile object 1 sequentially obtained by the second self-position estimation processing unit 12, or the like.

Figure 4A:
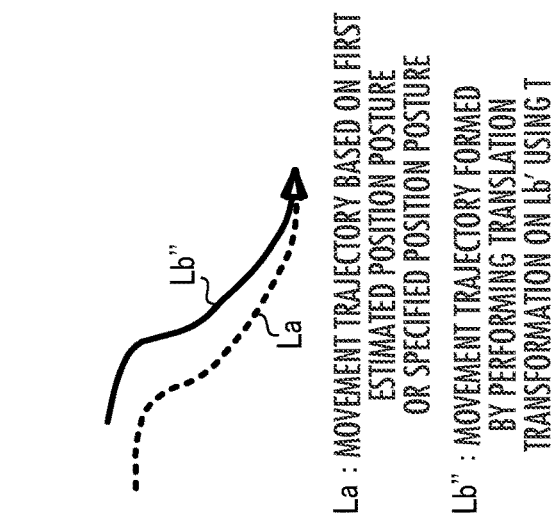
FIGS. 4A to 4C are diagrams for describing processing performed by a second correction processing unit illustrated in FIG. 2.

As a result, a movement trajectory (hereinafter, referred to as a movement trajectory Lb) of the mobile object 1 indicated by the time-series data of the second estimated position posture may deviate from a movement trajectory (hereinafter, referred to as a movement trajectory La) of the mobile object 1 indicated by the time-series data of the first estimated position posture or the time-series data of the specified position posture as illustrated in FIG. 4A. Further, in the present embodiment, the self-position specifying processing unit 15 obtains the specified position posture of the mobile object 1 as described above. Therefore, immediately after the start of the movement of the mobile object 1, the stability of the specified position posture obtained by the self-position specifying processing unit 15 may be poor.

Figure 4B:
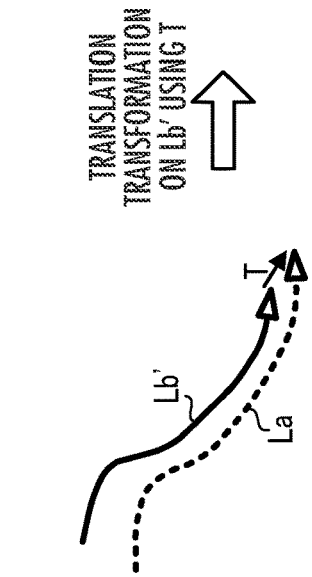

Therefore, when the predetermined period has elapsed for the first time immediately after the start of the movement of the mobile object 1, the second correction processing unit 16 uses the time-series data of the second estimated position posture output from the second self-position estimation processing unit 12 and the time-series data of the first estimated position posture output from the first self-position estimation processing unit 11 within the predetermined period to determine a rotation transformation matrix R for performing rotational transformation so that the movement trajectory Lb of the mobile object 1 indicated by the time-series data of the second estimated position posture is brought closer to the movement trajectory La of the mobile object 1 indicated by the time-series data of the first estimated position posture. The rotation transformation matrix R is determined using, for example, a point cloud library (PCL) which is a known point cloud processing library. A movement trajectory Lb' illustrated in FIG. 4B represents a movement trajectory after the rotation transformation on the movement trajectory Lb by using the rotation transformation matrix R.

Figure 4C:
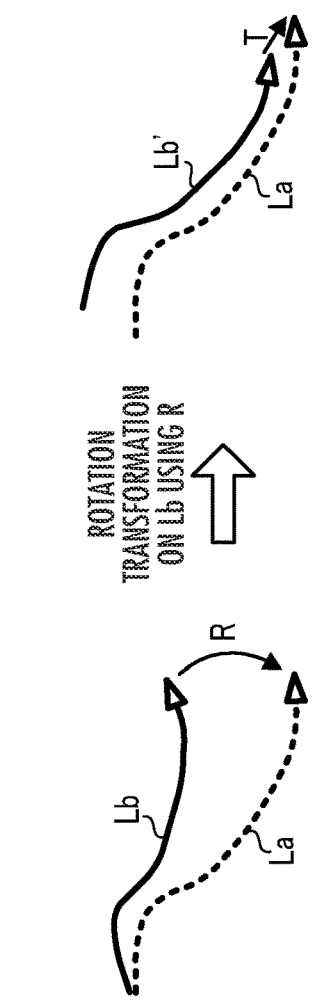

Moreover, as illustrated in FIG. 4C, the second correction processing unit 16 determines a translation transformation operation amount T (for example, a translation movement vector) for performing translation movement so that a terminus of the movement trajectory Lb' formed by performing rotation transformation on the movement trajectory Lb of the mobile object 1 indicated by the time-series data of the second estimated position posture using the rotation transformation matrix R is consistent with a terminus of the movement trajectory La of the mobile object 1 indicated by the time-series data of the first estimated position posture, and the translation transformation operation amount T is obtained from the position (in the global coordinate system) of the terminus of the movement trajectory Lb' after the rotation transformation and the position (in the global coordinate system) of the terminus of the movement trajectory La. A movement trajectory Lb" illustrated in FIG. 4C represents a movement trajectory after the movement trajectory Lb' is subjected to the translation transformation by the translation transformation operation amount T.

When the predetermined period has elapsed for the second and subsequent times, the second correction processing unit 16 determines the rotation transformation matrix R and the translation transformation operation amount T in a similar manner to that described above by using the time-series data of the specified position posture output from the self-position specifying processing unit 15 instead of the time-series data of the first estimated position posture.

In the present embodiment, the second correction processing unit 16 basically outputs the rotation transformation matrix R and the translation transformation operation amount T determined as described above to the second self-position estimation processing unit 12 as correction parameters for correcting the second estimated position posture every time the predetermined period elapses. However, in the present embodiment, since the posture in the estimated position posture obtained by the first self-position estimation processing unit 11 and the posture in the specified position posture specified by the self-position specifying processing unit 15 are postures in the yaw direction, it is preferable that the rotation transformation matrix R rotates the second estimated position posture in the yaw direction or substantially in the yaw direction.

Therefore, in the present embodiment, the second correction processing unit 16 outputs the rotation transformation matrix R and the translation transformation operation amount T to the second self-position estimation processing unit 12 as the correction parameters only when a component (specifically, components of three rows and three columns) related to the rotation transformation in the yaw direction in the rotation transformation matrix R determined as described above has a value sufficiently close to "1" (specifically, in a case where an absolute value of a deviation between the component and "1" is smaller than a predetermined threshold near zero). Then, the second correction processing unit 16 instructs the second self-position estimation processing unit 12 to correct the second estimated position posture using the correction parameters.

At this time, the second self-position estimation processing unit 12 corrects the second estimated position posture obtained by using the ORB_SLAM algorithm as described above, by using the correction parameters (the rotation transformation matrix R and the translation transformation operation amount T) input from the second correction processing unit 16 in the subsequent estimation processing. That is, the second self-position estimation processing unit 12 performs the rotation transformation on the second estimated position posture obtained by using the ORB-_SLAM algorithm, by using the rotation transformation matrix R, and performs the translation transformation on the second estimated position posture by using the translation transformation operation amount T, thereby correcting the second estimated position posture. Then, the second self-position estimation processing unit 12 outputs the corrected second estimated position posture.

Furthermore, in a case where the component related to the rotation transformation in the yaw direction in the rotation transformation matrix R does not have a value sufficiently close to "I" (in a case where the absolute value of the deviation between the component and "1" is larger than the predetermined threshold near zero), the second correction processing unit 16 does not instruct the second self-position estimation processing unit 12 to correct the second estimated position posture. Furthermore, the second correction processing unit 16 does not output the rotation transformation matrix R and the translation transformation operation amount T to the second self-position estimation processing unit 12. At this time, the second self-position estimation processing unit 12 outputs the second estimated position posture obtained by using the ORB_SLAM algorithm without correcting the second estimated position posture.

As described above, the second estimated position posture obtained by the second self-position estimation processing unit 12 that estimates the self-position of the mobile object 1 by using the ORB_SLAM algorithm as an example of VISUAL_SLAM is corrected according to the correction parameters (the rotation transformation matrix R and the translation transformation operation amount T) determined by the second correction processing unit 16 using the first estimated position posture output by the first self-position estimation processing unit 11 or the specified position posture output by the self-position specifying processing unit 15 every time the predetermined period elapses (intermittently). As a result, the error of the second estimated position posture is prevented from being accumulatively increased due to the error of the initial position posture of the mobile object 1 in the estimation processing performed by the second self-position estimation processing unit 12 and the error of the movement amount and the movement direction of the mobile object 1 sequentially obtained in the estimation processing.

In the present embodiment, since the processing performed by the self-position estimation processing device 10 is performed as described above, the error of each of the first estimated position posture and the second estimated position posture is prevented from being increased. Therefore, it is possible to maintain the reliability of the specified position posture output by the self-position specifying processing unit 15 with high robustness.

Second Embodiment

Next, a second embodiment of the present invention will be described with reference to FIGS. 5 to 6B. Note that the present embodiment is different from the first embodiment only in some processing performed by the self-position estimation processing device 10, and thus a description of the same matters as those of the first embodiment will be omitted.

Figure 5:
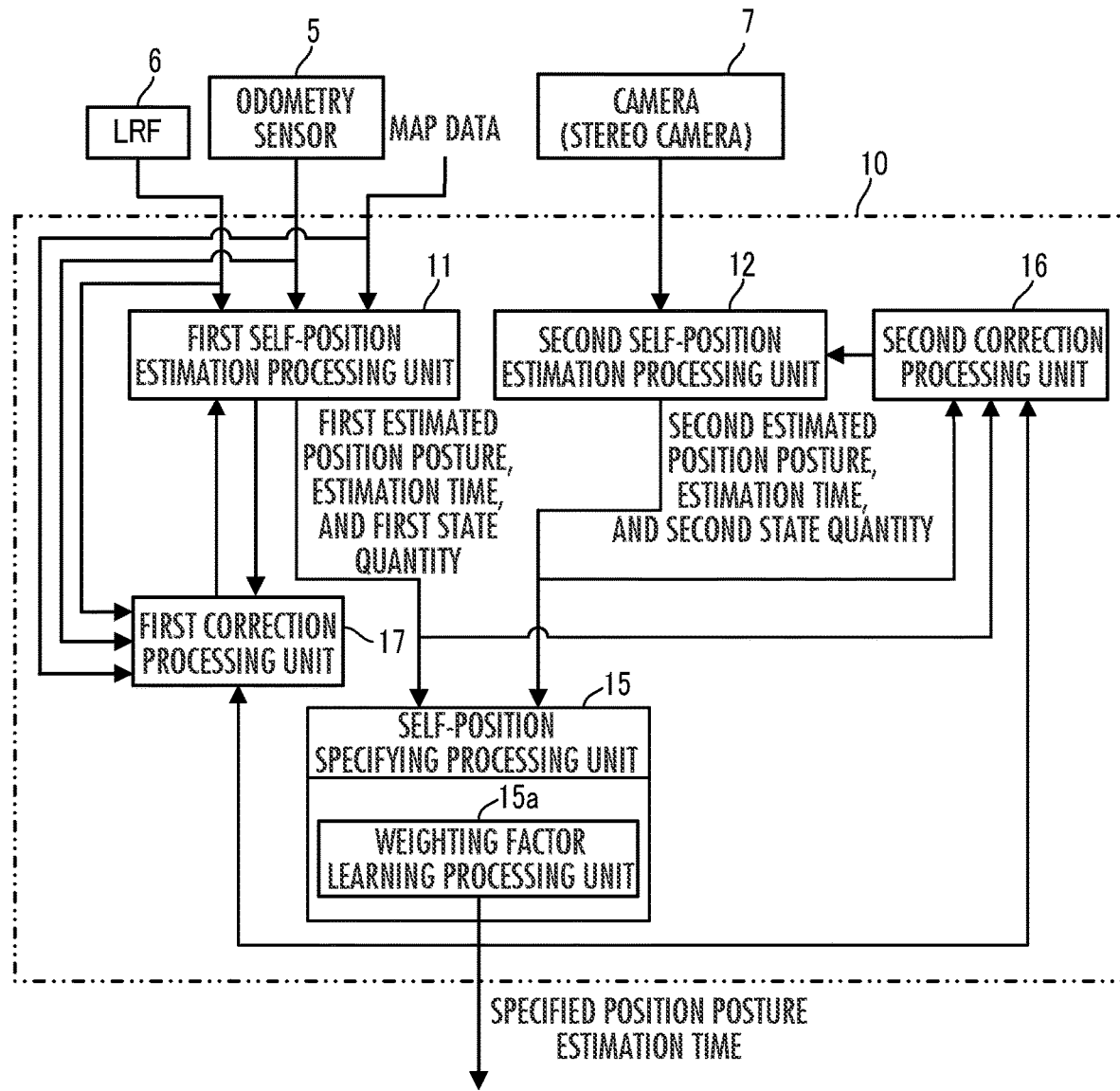
FIG. 5 is a block diagram illustrating a functional configuration of a self-position estimation processing device according to the second embodiment.

Referring to FIG. 5, in the present embodiment, in addition to the first self-position estimation processing unit 11, the second self-position estimation processing unit 12, the self-position specifying processing unit 15, and the second correction processing unit 16, the self-position estimation processing device 10 includes a first correction processing unit 17 that performs processing for correcting the first estimated position posture output by the first self-position estimation processing unit 11.

The present embodiment is different from the first embodiment in processing related to the first self-position estimation processing unit 11 and the first correction processing unit 17. Specifically, in the present embodiment, the first self-position estimation processing unit 11 sequentially obtains the first estimated position posture by using the MCL algorithm and outputs the first estimated position posture, similarly to the first embodiment. In parallel with this, the first self-position estimation processing unit 11 sequentially determines the level of reliability of the first estimated position posture obtained by using the MCL algorithm.

In this case, in the processing of sequentially determining the level of reliability of the first estimated position posture, the first self-position estimation processing unit 11 determines that the reliability of the first estimated position posture is low in a case where a predetermined condition among the conditions 1 to 3 (or the conditions 1 to 3') is satisfied, or in a case where the predetermined condition is continuously satisfied a predetermined number of times or more, similarly to the first embodiment. In addition, also in a case where a condition 4 that the reliability of the detection information of the odometry sensor 5 is low is satisfied, the first self-position estimation processing unit 11 determines that the reliability of the first estimated position posture is low.

Here, the reliability of the detection information of the odometry sensor 5 is decreased, for example, when the mobile object 1 moves on a step. Therefore, in the present embodiment, the first self-position estimation processing unit 11 monitors whether or not the mobile object 1 moves on a step. Then, in a case where it is recognized that the mobile object 1 moves on the step, the first self-position estimation processing unit 11 determines that the condition 4 is satisfied, and eventually, the reliability of the first estimated position posture is low. In this case, for example, the angular velocity of the mobile object 1 in the pitch direction is observed using an angular velocity sensor or the like mounted on the mobile object 1. Then, it is possible to determine whether or not the mobile object 1 moves on a step depending on whether or not an absolute value of the angular velocity exceeds a predetermined threshold.

Then, in a case where it is determined that the reliability of the first estimated position posture is low, the first self-position estimation processing unit 11 starts the processing performed by the first correction processing unit 17 while continuing to estimate the self-position of the mobile object 1 by using the MCL algorithm.

In this case, similarly to the first self-position estimation processing unit 11, the detection information of each of the LRF 6 and the odometry sensor 5 is input to the first correction processing unit 17, together with the map data of the movement environment of the mobile object 1. Then, the first correction processing unit 17 performs different processing between a case where it is determined that the reliability of the first estimated position posture is low based on the predetermined condition among the conditions 1 to 3 (or the conditions 1 to 3') and a case where it is determined that the reliability of the first estimated position posture is low based on the condition 4.

Figure 6A:
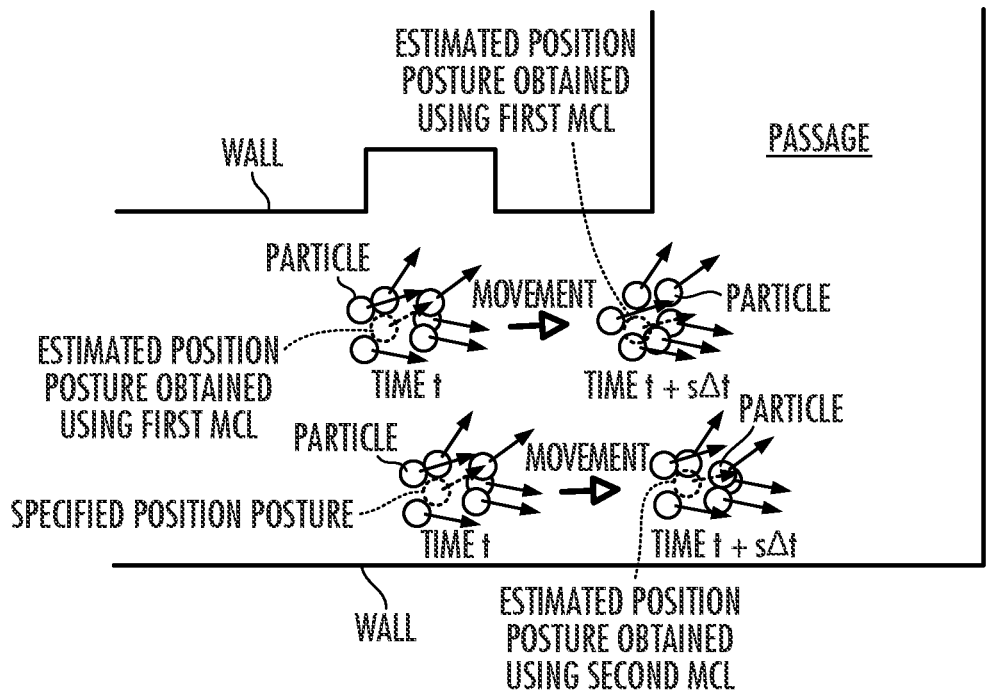
FIGS. 6A and 6B are explanatory diagrams related to processing performed by a first self-position estimation processing unit and a first correction processing unit illustrated in FIG. 5.

In a case where it is determined that the reliability of the first estimated position posture is low based on the predetermined condition among the conditions 1 to 3 (or the conditions 1 to 3'), as illustrated in FIG. 6A, the first correction processing unit 17 newly sets the initial position posture of the mobile object 1, and then starts processing of sequentially estimating the self-position of the mobile object 1 by using an MCL algorithm (hereinafter, referred to as second MCL) different from the MCL algorithm (hereinafter, referred to as first MCL) that is being performed by the first self-position estimation processing unit 11 (a time t in FIG. 6A).

In this case, in the first correction processing unit 17, the specified position posture (latest value) output from the self-position specifying processing unit 15 is used as the initial position posture of the mobile object 1. In addition, the self-position estimation processing performed by the first correction processing unit 17 using the second MCL is processing performed in the same manner as the self-position estimation processing performed by the first self-position estimation processing unit 11 using the first MCL. Hereinafter, the self-position sequentially estimated by the first correction processing unit 17 using the second MCL is referred to as a 12-th estimated position posture. In parallel with this, the self-position sequentially estimated by the first self-position estimation processing unit 11 is referred to as an 11-th estimated position posture. The 11-th estimated position posture corresponds to an A1-th self-position estimated value in the present invention, and the 12-th estimated position posture corresponds to an A2-th self-position estimated value in the present invention.

In the self-position estimation processing using the second MCL, when the generated particles are moved, error distribution of the detection information of the odometry sensor 5 may be set to be wider than that in a case of using the first MCL, and each particle may be moved so as to stochastically reflect the error in the wide error distribution. In addition, in the self-position estimation processing using the second MCL, the total number of generated particles may be larger than that in a case of using the first MCL.

In addition, the first correction processing unit 17 sequentially determines the level of reliability of the self-position (the 12-th estimated position posture) estimated by using the second MCL, and sequentially outputs the determination result to the first self-position estimation processing unit 11. In this case, the determination of the level of reliability of the 12-th estimated position posture is performed based on the predetermined condition among the conditions 1 to 3 (or the conditions 1 to 3'), similarly to the processing of determining the level of reliability of the first estimated position posture in the first embodiment.

In addition, the first self-position estimation processing unit 11 sequentially determines the level of reliability of the self-position (the 11-th estimated position posture) estimated by using the first MCL based on the predetermined condition among the conditions 1 to 3 (or the conditions 1 to 3') as in the first embodiment.

Then, the first self-position estimation processing unit 11 determines which one of the 11-th estimated position posture and the 12-th estimated position posture has higher reliability, based on the respective time series of the result of determining the reliability of the 11-th estimated position posture and the result of determining the reliability of the 12-th estimated position posture. In the present embodiment, for example, in a case where the determination result indicating that the reliability of one of the 11-th estimated position posture and the 12-th estimated position posture is high is obtained continuously a predetermined number of times, it is determined that the one estimated position posture has higher reliability than the other estimated position posture.

Then, after this determination, the first self-position estimation processing unit 11 continues to perform the MCL algorithm (the first MCL or the second MCL) corresponding to the estimated position posture determined to have higher reliability among the 11-th estimated position posture and the 12-th estimated position posture. As a result, the first self-position estimation processing unit 11 sequentially estimates the self-position of the mobile object 1 and sequentially outputs the estimated value as the first estimated position posture. Note that in a period from when the self-position estimation processing performed by the first correction processing unit 17 starts to when the above determination is confirmed, the first self-position estimation processing unit 11 outputs, for example, the self-position (the 11-th estimated position posture) estimated by using the first MCL algorithm as the first estimated position posture.

In addition, for example, in a case where a state in which the self-position (the 11-th estimated position posture) estimated by using the first MCL and the self-position (the 12-th estimated position posture) estimated by using the second MCL are close to each other (a state in which an absolute value of a deviation therebetween is equal to or less than a predetermined threshold) occurs continuously a predetermined number of times, the processing performed by the first correction processing unit 17 may be ended. Thereafter, the first self-position estimation processing unit 11 may continuously perform the first MCL or the second MCL to sequentially estimate the self-position of the mobile object 1 and sequentially output the estimated value as the first estimated position posture.

Figure 6B:
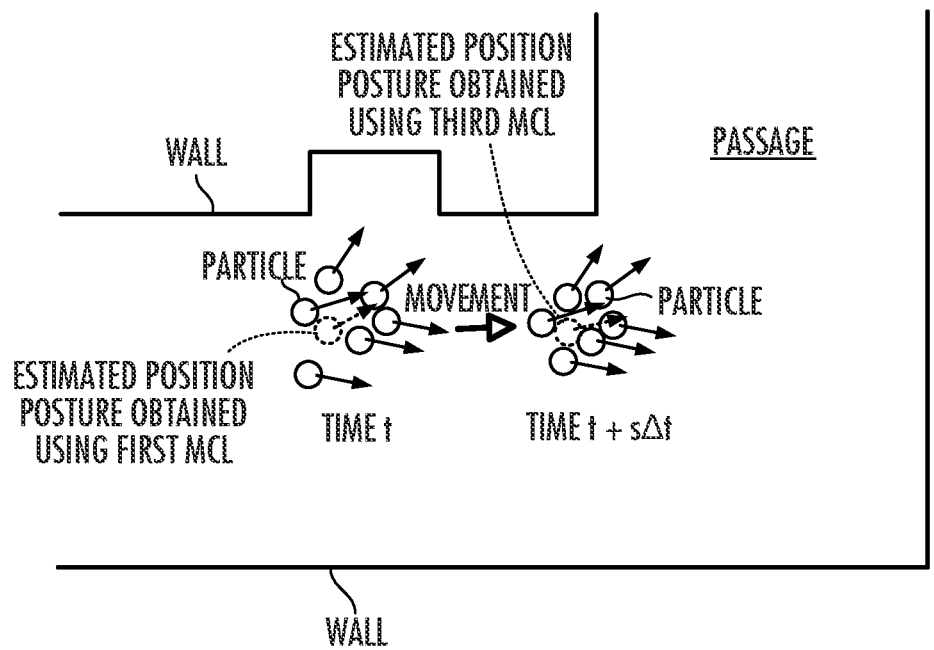

On the other hand, in a case where it is determined that the reliability of the first estimated position posture is low based on the condition 4 (in other words, in a case where it is determined that the reliability of the detection information of the odometry sensor 5 is low), the first correction processing unit 17 sets the latest value of the first estimated position posture obtained by the first self-position estimation processing unit 11 as the initial position posture of the mobile object 1 and arranges a plurality of particles around the initial position posture as illustrated in FIG. 6B. Then, after this arrangement, the first correction processing unit 17 starts processing of sequentially estimating the self-position of the mobile object 1 by using an MCL algorithm (hereinafter, referred to as third MCL) different from the MCL algorithm (first MCL) that is being performed by the first self-position estimation processing unit 11 (a time t in FIG. 6B).

In this case, in order to make the condition of the self-position estimation processing using the third MCL different from the condition of the self-position estimation processing using the first MCL, the plurality of particles are arranged around the initial position posture (the latest value of the first estimated position posture) of the mobile object 1 according to the third MCL so that a variance of the position postures of the plurality of particles is larger than a variance of the position postures of the plurality of particles arranged by the resampling processing using the first MCL.

The subsequent self-position estimation processing using the third MCL is processing performed in the same manner as the self-position estimation processing performed by the first self-position estimation processing unit 11 using the first MCL. Hereinafter, the self-position sequentially estimated by the first correction processing unit 17 using the third MCL is referred to as a 13-th estimated position posture. Further, similarly to the case where it is determined that the reliability of the first estimated position posture is low based on the predetermined condition among the conditions 1 to 3 (or the conditions 1 to 3'), the self-position sequentially estimated by the first self-position estimation processing unit 11 using the first MCL is referred to as the 11-th estimated position posture. In this case, the 13-th estimated position posture and the 11-th estimated position posture respectively correspond to an A3-th self-position estimated value and the A1-th self-position estimated value in the present invention.

In addition, the first correction processing unit 17 sequentially determines the level of reliability of the self-position (the 13-th estimated position posture) estimated by using the third MCL, and sequentially outputs the determination result to the first self-position estimation processing unit 11. In parallel with this, the first self-position estimation processing unit 11 sequentially determines the level of reliability of the self-position (the 11-th estimated position posture) estimated by using the first MCL. In this case, the determination of the level of reliability of each of the 11-th estimated position posture and the 13-th estimated position posture is performed based on the predetermined condition among the conditions 1 to 3 (or the conditions 1 to 3'), similarly to the processing of determining the level of reliability of the first estimated position posture in the first embodiment.

Then, the first self-position estimation processing unit 11 determines which one of the 11-th estimated position posture and the 13-th estimated position posture has higher reliability, based on the respective time series of the result of determining the reliability of the 11-th estimated position posture and the result of determining the reliability of the 13-th estimated position posture. In the present embodiment, for example, in a case where the determination result indicating that the reliability of one of the 11-th estimated position posture and the 13-th estimated position posture is high is obtained continuously a predetermined number of times, it is determined that the one estimated position posture has higher reliability than the other estimated position posture.

Then, after this determination, the first self-position estimation processing unit 11 continuously performs the MCL algorithm (the first MCL or the third MCL) corresponding to the estimated position posture determined to have higher reliability among the 11-th estimated position posture and the 13-th estimated position posture, thereby sequentially estimating the self-position of the mobile object 1 and sequentially outputting the estimated value as the first estimated position posture. Note that in a period from when the self-position estimation processing performed by the first correction processing unit 17 starts to when the above determination is confirmed, the first self-position estimation processing unit 11 outputs, for example, the self-position (the 11-th estimated position posture) estimated by using the first MCL algorithm as the first estimated position posture.

The present embodiment is the same as the first embodiment except for the matters described above. In the present embodiment, the processing performed by the first self-position estimation processing unit 11 and the first correction processing unit 17 are performed as described above. Therefore, in a case where it is determined that the reliability of the first estimated position posture is low based on the predetermined condition among the conditions 1 to 3 (or the conditions 1 to 3'), when it is determined that the reliability of the 11-th estimated position posture is higher than that of the 12-th estimated position posture after the determination, the first self-position estimation processing unit 11 continuously outputs the self-position (the 11-th estimated position posture) estimated by using the first MCL as the first estimated position posture.

Further, in a case where it is determined that the reliability of the first estimated position posture is low based on the condition 4, when it is determined that the reliability of the 11-th estimated position posture is higher than that of the 13-th estimated position posture after the determination, the first self-position estimation processing unit 11 continuously outputs the self-position (the 11-th estimated position posture) estimated by using the first MCL as the first estimated position posture.

Therefore, in a case where the decrease in reliability of the estimated position posture obtained by using the first MCL is temporary, the self-position (the 11-th estimated position posture) estimated by using the first MCL can be continuously output as the first estimated position posture.

On the other hand, in a case where it is determined that the reliability of the first estimated position posture is low based on the predetermined condition among the conditions 1 to 3 (or the conditions 1 to 3'), when it is determined that the reliability of the 12-th estimated position posture is higher than that of the 11-th estimated position posture after the determination, the first self-position estimation processing unit 11 switches the MCL algorithm for self-position estimation from the first MCL to the second MCL, and outputs the self-position estimated by using the second MCL as the first estimated position posture.

Further, in a case where it is determined that the reliability of the first estimated position posture is low based on the condition 4, when it is determined that the reliability of the 13-th estimated position posture is higher than that of the 11-th estimated position posture after the determination, the first self-position estimation processing unit 11 switches the MCL algorithm for self-position estimation from the first MCL to the third MCL, and outputs the self-position estimated by using the third MCL as the first estimated position posture.

As a result, it is possible to prevent the first estimated position posture of the mobile object 1 obtained by the first self-position estimation processing unit 11 using the MCL algorithm (first MCL) from diverging to the position posture that is deviated from the actual position posture of the mobile object 1.

Note that the present invention is not limited to the embodiments described above, and another embodiment can be adopted. Hereinafter, some other embodiments will be described as examples.

In the first embodiment and the second embodiment, in a case where it is determined that the reliability of the first estimated position posture is low, the specified position posture obtained by the self-position specifying processing unit 15 is used to correct the first estimated position posture. However, for example, in a situation where the reliability of the second estimated position posture obtained by the second self-position estimation processing unit 12 can be regarded as being high, processing of correcting the first estimated position posture by using the second estimated position posture, instead of the specified position posture, may be performed.

In the first embodiment, the condition 4 is not used to determine the level of reliability of the first estimated position posture. However, in a situation where it is determined that the reliability of the first estimated position posture is low based on the condition 4, for example, processing of correcting the first estimated position posture may be performed as in the second embodiment.

Furthermore, in the second embodiment, for example, a part of the processing performed by the first self-position estimation processing unit 11 (for example, processing of determining the level of reliability of the 11-th estimated position posture and the level of reliability of the 12-th estimated position posture, processing of determining the level of reliability of the 11-th estimated position posture and the level of reliability of the 13-th estimated position posture, or the like) may be performed by the first correction processing unit 17 or another functional unit.

In each of the embodiments described above, the posture in the first estimated position posture obtained by the first self-position estimation processing unit 11 and the posture in the specified position posture obtained by the self-position specifying processing unit 15 are only the postures in the yaw direction. However, the first estimated position posture and the specified position posture may include the postures in the roll direction and the postures in the pitch direction.

Furthermore, the algorithm for the estimation processing performed by the second self-position estimation processing unit 12 is not limited to ORB_SLAM, and may be another SLAM algorithm.

In the above-described embodiments, a case where two self-position estimation processing units (the first and second self-position estimation processing units 11 and 12) are provided has been described as an example. However, for example, instead of the second self-position estimation processing unit 12 or in addition to the first and second self-position estimation processing units 11 and 12, a self-position estimation processing unit that can estimate the self-position of the mobile object 1 by using another algorithm may be provided. As the self-position estimation processing unit, for example, a self-position estimation processing unit that estimates the self-position of the mobile object 1 by using a magnetic sensor that can be mounted on the mobile object 1, the odometry sensor 5, and a map of a magnetic state of the movement environment of the mobile object 1 can be adopted. As an algorithm for the self-position estimation processing in this case, for example, an MCL algorithm similar to that of the first self-position estimation processing unit 11 can be used. Then, in this case, the self-position obtained by using the MCL algorithm may be appropriately corrected by a method similar to the processing of correcting the first estimated position posture in the first embodiment or the second embodiment.

Note that, in a case where three or more self-position estimation processing devices are provided, the weighting factor learning processing unit 15a can determine the weighting factor corresponding to each self-position estimation processing unit by a method similar to that in the above-described embodiments. Then, the self-position of the mobile object 1 may be specified by combining the self-positions estimated by the self-position estimation processing units using the weighting factors.

Furthermore, in the above-described embodiments, as the weighting factor learning processing unit 15a, the neural network that performs the multimodal learning has been described as an example. However, for example, a recursive neural network (RNN) such as a long short-term memory (LSTM) may be used as the weighting factor learning processing unit 15a.

In addition, the method for specifying the actual self-position of the mobile object 1 from the self-positions estimated by the plurality of self-position estimation processing units is not limited to the method described in the above-described embodiments. For example, the self-position estimated by one self-position estimation processing unit selected from the plurality of self-position estimation processing units may be specified as the actual self-position of the mobile object 1 as it is based on the operation state of the mobile object 1 or the state of the surrounding environment.

In the above-described embodiments, the LRF 6 is used as the distance measurement sensor. However, instead of the LRF 6, for example, an ultrasonic distance measurement sensor or the like may be used.

In the above-described embodiments, the wheel-type mobile object 1 has been described an example of the mobile object. However, the mobile object to which the present invention is applied is not limited to the wheel-type mobile object, and may be, for example, a leg-type mobile object, an inverted pendulum type mobile object, or the like.

What is claimed is:

1. A self-position estimation method of estimating, from detection information of a plurality of sensors, a self-position of a mobile object, the mobile object being one of a wheel-type mobile object, a leg-type mobile object, or an inverted pendulum type mobile object, the mobile object including a processor configured to estimate the self-position of the mobile object and to perform movement control for the mobile object, and a plurality of sensors, the self-position of the mobile object being estimated by the processor by using each of a plurality of algorithms each using detection information of one or more of the plurality of sensors, and specifying the self-position of the mobile object based on each of estimated positions obtained by each of the plurality of algorithms,
   the plurality of algorithms including an A-th algorithm which is a first Monte Carlo Localization (MCL) algorithm, a B-th algorithm which is a non-MCL algorithm, and a C-th algorithm which is a second MCL algorithm different from the first MCL algorithm, the self-position estimation method comprising:
   a reliability determination step of determining a level of reliability of an A-th self-position which is one of the estimated self-positions obtained by using the A-th algorithm;
   a correction step of performing, in a case where it is determined that the level of reliability of the A-th self-position is low, processing for correcting the A-th self-position by using any one of a B-th self-position which is one of the estimated self-positions obtained by using the B-th algorithm, and a C-th self-position which is another of the estimated self-positions obtained by using the C-th algorithm;
   a specifying step of specifying the self-position of the mobile object based on the B-th self-position and one of: the A-th position corrected in the correction step in the case where it is determined that the level of reliability of the A-th self-position is low; and the A-th position without correction in the correction step in a case where it is determined that the level of reliability of the A-th position is not low; and
   performing movement control using the self-position specified in the specifying step.

2. The self-position estimation method according to claim 1, wherein
   in the reliability determination step, at least one of index values including a covariance generated in a process of estimating the self-positions by using the A-th algorithm, a likelihood of a plurality of particles for a particle filter used in the A-th algorithm, and a deviation between the A-th self-position and the B-th self-position is used to determine the level of reliability of the A-th self-position.

3. The self-position estimation method according to claim 2, wherein
   in the correction step, the plurality of particles for the particle filter used in the A-th algorithm are partially or entirely generated around the B-th self-position, and the A-th self-position is obtained by using the A-th algorithm and using the generated particles.

4. The self-position estimation method according to claim 2, wherein
   in the correction step, performing processing of correcting the A-th self-position by setting the B-th self-position as an initial position of the mobile object, and, using the A-th self-position and the C-th self-position estimated by processing of the C-th algorithm in parallel with the A-th algorithm, comparing the level of reliability of the A-th self-position with a level of reliability of the C-th self-position, and, following confirmation of a result of the comparison, correcting the A-th self-position by using one of the A-th algorithm and the C-th algorithm which corresponds to one of the A-th self-position and the C-th self-position having a higher reliability.

5. The self-position estimation method according to claim 2, wherein
   the reliability determination step includes a step of determining, as the level of reliability of the A-th self-position, a level of reliability of detection information of an odometry sensor included in the plurality of sensors as a sensor used in the MCL algorithm, and
   in the correction step in a case where it is determined that the reliability of the detection information of the odometry sensor is low, processing of correcting the A-th self-position by setting, as an initial position of the mobile object, the A-th self-position and by using the C-th algorithm in parallel with the A-th algorithm, and processing of comparing the level of reliability of the A-th self-position with a level of reliability of the C-th self-position, and, following confirmation of a result of the comparison, correcting the A-th self-position by using one of the A-th algorithm and the C-th algorithm that corresponds to one of the A-th self-position and the C-th self-position having a higher reliability.

6. The self-position estimation method according to claim 1, wherein
   in the correction step, a plurality of particles for a particle filter used in the A-th algorithm are partially or entirely generated around the B-th self-position, and the A-th self-position is obtained by using the A-th algorithm and using the generated particles.

7. The self-position estimation method according to claim 1, wherein
   in the correction step, performing processing of correcting the A-th self-position by setting the B-th self-position as an initial position of the mobile object, and, using the A-th self-position and the C-th self-position estimated by processing of the C-th algorithm in parallel with A-th algorithm, comparing the level of reliability of the A-th self-position with a level of reliability of the C-th self-position, and, following confirmation of a result of the comparison, correcting the A-th self-position by using one of the A-th algorithm and the C-th algorithm which corresponds to one of the A-th self-position and the C-th self-position having a higher reliability.

8. The self-position estimation method according to claim 1, wherein
   the reliability determination step includes a step of determining, as the level of reliability of the A-th self-position, a level of reliability of detection information of an odometry sensor included in the plurality of sensors as a sensor used in the first MCL algorithm, and
   in the correction step in a case where it is determined that the reliability of the detection information of the odometry sensor is low, processing of correcting the A-th self-position by setting, as an initial position of the mobile object, the A-th self-position and by using the C-th algorithm in parallel with the A-th algorithm, and processing of comparing the level of reliability of the A-th self-position with a level of reliability of the C-th self-position, and, following confirmation of a result of the comparison, correcting the A-th self-position by using one of the A-th algorithm and the C-th algorithm that corresponds to one of the A-th self-position and the C-th self-position having a higher reliability.

9. The self-position estimation method according to claim 1, wherein the plurality of sensors are mounted on the mobile object and include an odometry sensor, a laser range finder, and a camera, detection information from the odometry sensor and the laser range finder are used as inputs to the A-th algorithm and the C-th algorithm, and detection information from the camera is used as an input to the B-th algorithm.

* * * * *